Patented Feb. 12, 1952

2,585,432

UNITED STATES PATENT OFFICE 2,585,432

DIBENZYLAMINE SALTS OF PENICILLIN

Frank H. Buckwalter, Dewitt, N. Y., assignor to Bristol Laboratories Inc., Syracuse, N. Y., a corporation of New York No Drawing. Application October 19, 1948, Serial No. 55,440

4 Claims. (Cl. 260—239.1)

The present invention relates to a new amine salt of penicillin which is capable of exerting a repository antibiotic action.

The new penicillin salt of the present invention has the following formula

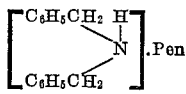

wherein Pen designates an acid penicillin radical or an active moiety thereof, capable of forming an addition salt with dibenzylamine.

A more comprehensive understanding of this invention is obtained by reference to the following examples.

Example 1

2.3 cc. of 1 N HCl is added to .66 gram of dibenzylamine in 10 cc. of water to make one mole of the hydrochloride addition salt of dibenzylamine. 1.32 grams of sodium penicillin G is then added to 40 cc. of water to yield a solution of 51,550 units per cc. of sodium penicillin G. The water solution of dibenzylamine hydrochloride is then added to the water solution of sodium penicillin G and 1.62 grams of a white crystalline precipitate is immediately formed having a potency of 713 units per mg. Yield 2.0 gm.

Example 2

.19 grams of dibenzylamine are added to .8 cc. of 1 N CHl and 1 cc. water. To this mixture was added 0.66 gram sodium penicillin G in 20 cc. of water. An immediate white precipitate was formed on cooling. This was filtered off and vacuum dried and the crystalline salt of dibenzylamine penicillin G having a potency of 1075 units per mg. was obtained.

Example 3

To .66 gram of dibenzylamine dissolved in ether was added a dried ether solution of quantities of penicillin acid obtained from 1.32 grams of sodium penicillin G. An immediate white crystalline precipitate of dibenzylamine penicillin G was obtained. The precipitate was filtered off, dried in vacuum, yield 1.8 grams. Potency 1190 units per mg.

While the present invention has been described with particular reference to the dibenzylamine addition salts of penicillin G it will be understood that dibenzylamine salts of other penicillins are also included within the scope of this invention. For instance, the natural penicillins such as penicillin G, F, dihydro F, X and K are included within the scope of the present invention.

It will also be understood that the reaction can be carried out in organic solvents other than ether. Examples of such solvents are butanol, propanol, amyl acetate, methyl amyl acetate, isopropyl ether, mesityl oxide, methyl isobutyl ketone.

It will be understood that, without departing from the spirit of the invention or the scope of the claims, various modifications may be made in the specific expedients described. The latter are illustrative only, and not offered in a restricting sense, it being desired that only such limitations shall be placed thereon as may be required by the state of the prior art.

I claim:

1. A crystalline salt of penicillin and dibenzylamine.
2. A crystalline salt of penicillin G and dibenzylamine.
3. A crystalline salt of penicillin X and dibenzylamine.
4. A crystalline salt of penicillin dihydro F and dibenzylamine.

FRANK H. BUCKWALTER.

REFERENCES CITED

The following references are of record in the file of this patent:

UNITED STATES PATENTS

| Number | Name | Date |
|---|---|---|
| 2,493,625 | Goldberg et al. | Jan. 3, 1950 |
| 2,515,898 | Rhodehamel | July 18, 1950 |

OTHER REFERENCES

British Report CMR–Br. 234 (PB 79,927), received U. S. April 18, 1946, published December 5, 1947, pp. 1–4.